United States Patent
Sucke et al.

(10) Patent No.: US 6,687,995 B1
(45) Date of Patent: Feb. 10, 2004

(54) HEAT EXCHANGER AND METHOD FOR PRODUCING A HEAT EXCHANGER

(75) Inventors: Norbert Sucke, Duisburg (DE); Ismail Boyraz, Bochum (DE)

(73) Assignee: Erbslöh AG, Velvert (DE)

( * ) Notice: Subject to any disclaimer, the term of this patent is extended or adjusted under 35 U.S.C. 154(b) by 0 days.

(21) Appl. No.: 09/980,746

(22) PCT Filed: May 3, 2000

(86) PCT No.: PCT/EP00/03936

§ 371 (c)(1), (2), (4) Date: Nov. 15, 2001

(87) PCT Pub. No.: WO00/70291

PCT Pub. Date: Nov. 23, 2000

(30) Foreign Application Priority Data

May 18, 1999 (DE) .......................................... 199 22 673

(51) Int. Cl.⁷ .............................................. B21D 39/06
(52) U.S. Cl. .................. 29/890.043; 165/173; 165/178; 165/153; 165/76; 29/890.054; 228/183; 228/173.4
(58) Field of Search .......................... 165/76, 173, 178, 165/153; 29/890.054, 890.043; 228/183, 173.1, 173.4, 173.6, 245–261

(56) References Cited

U.S. PATENT DOCUMENTS

| | | | |
|---|---|---|---|
| 1,931,311 A | * 10/1933 | Young | .......................... 165/153 |
| 2,832,570 A | 4/1958 | Schoessow | |
| 3,667,109 A | * 6/1972 | Alcenius | ...................... 228/245 |
| 3,750,266 A | 8/1973 | Hikido et al. | |
| 4,650,110 A | * 3/1987 | Cheng | .................... 29/890.054 |
| 5,101,887 A | * 4/1992 | Kado | .......................... 165/173 |
| 5,772,104 A | * 6/1998 | Paulman | ...................... 228/254 |
| 5,796,189 A | * 8/1998 | Manning et al. | ............. 228/183 |
| 6,000,461 A | 12/1999 | Ross et al. | |

FOREIGN PATENT DOCUMENTS

| | | |
|---|---|---|
| DE | 195 15 909 A1 | 10/1996 |
| FR | 2121909 | 1/1971 |
| JP | 63-80194 | 4/1988 |
| JP | 10-246592 | 9/1998 |
| JP | 2001250892 A * | 9/2001 |

* cited by examiner

Primary Examiner—Leonard Leo
(74) Attorney, Agent, or Firm—Friedrich Kueffner

(57) ABSTRACT

The invention relates to a heat exchanger comprising two manifolds (10). Profiled pipe sections (11) are accommodated with a lamella configuration (12) between said manifolds. According to the invention, an obstructing means (13) for preventing the flow of solder is provided on the exterior of the profiled pipe section (11) between the manifold (10) and the lamella configuration (12). The invention also relates to a method for producing a heat exchanger. The invention provides that the obstructing means (13) is formed on the profiled pipe sections (11) before the sections are cut from a profiled pipe billet.

13 Claims, 2 Drawing Sheets

Figure 6:
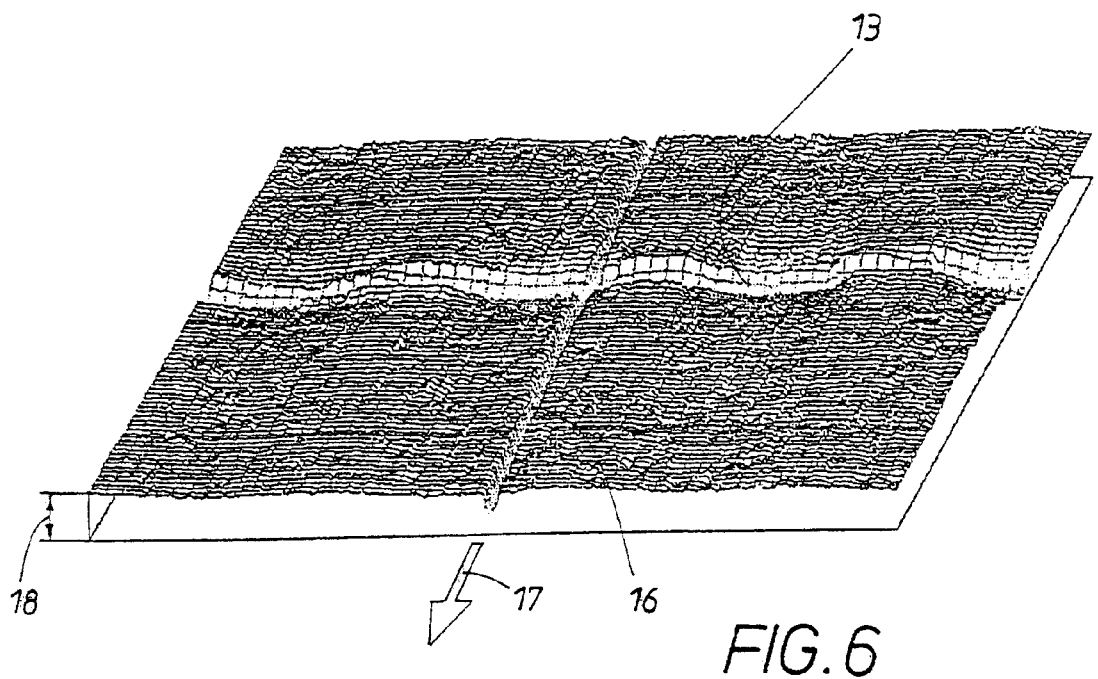

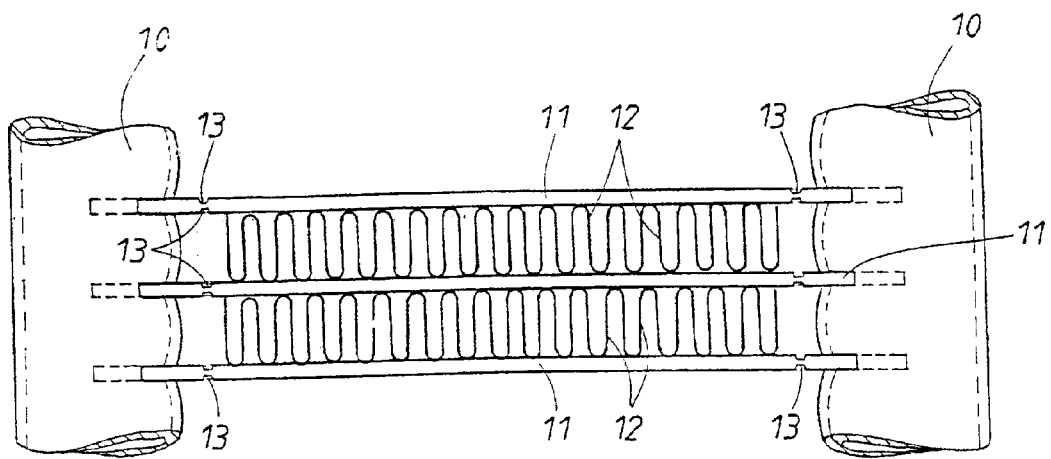
FIG.1
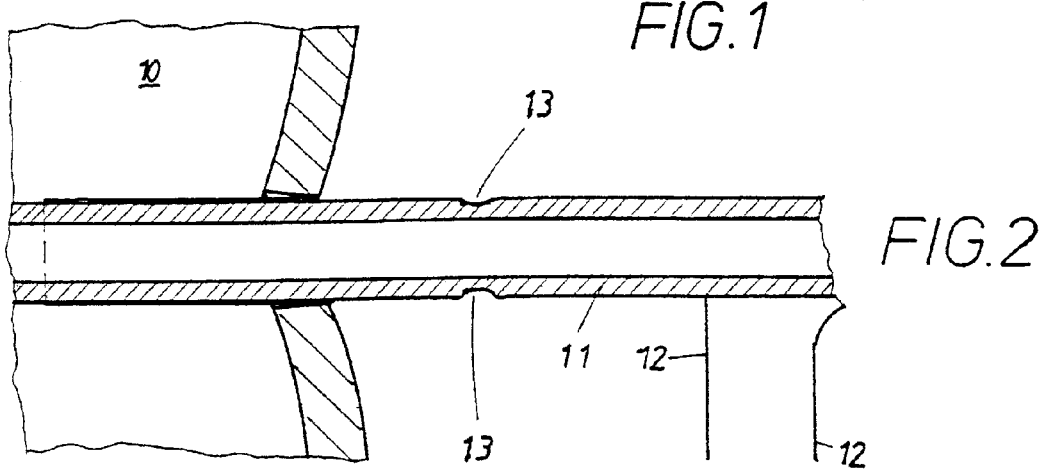
FIG.2
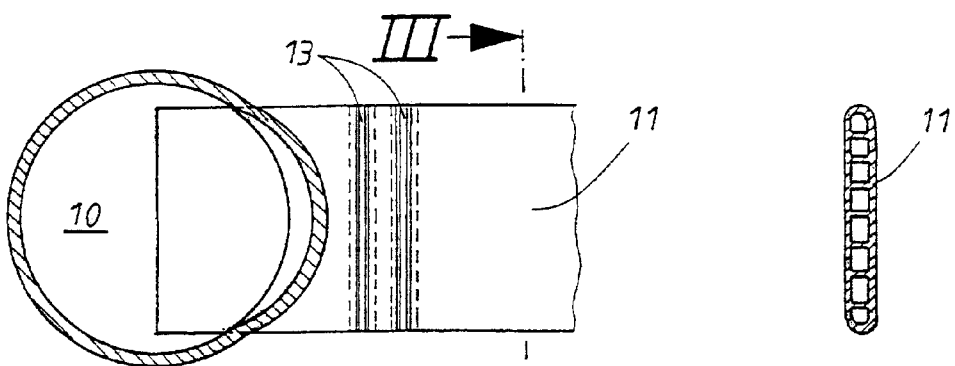
FIG. 4
FIG. 3
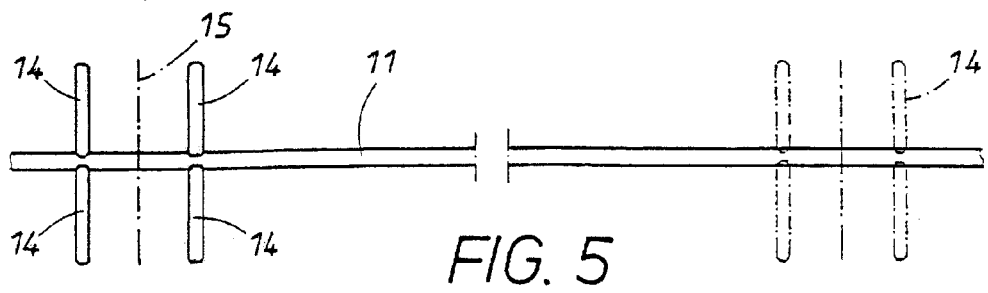
FIG. 5

HEAT EXCHANGER AND METHOD FOR PRODUCING A HEAT EXCHANGER

The invention relates to a heat exchanger, in particular, for use in automobile manufacture, comprised of extruded profile sections, preferably of aluminum or aluminum alloy, which are arranged parallel to one another and are connected with their two ends to a manifold, respectively, wherein between neighboring sides of two profiled pipe sections a lamellar arrangement is attached by soldering. The multi-chamber profiled pipes can be coated with zinc, brazing, and/or a flux agent in order to improve the corrosion resistance and soldering properties (compare DE 195 15 909 A1).

In particular, the invention relates to heat exchangers which are soldered with non-corrosive flux agents according to the inert gas soldering method.

However, it was found that by unevenness and roughness, in particular, longitudinal grooves in the extrusion direction of the extruded profiles, the soldering agent does not remain at the locations provided therefor but will move away from the actual soldering location, for example, by capillary action or by grooves so that during soldering a destruction or damage by means of a so-called soldering erosion occurs. By soldering erosion the properties, such as seal-tightness, bursting pressure resistance, pressure change resistance, and corrosion resistance, required for the prescribed use of the heat exchanger can be changed disadvantageously. Soldering erosion can neither be safely prevented nor detected with the conventional process safety methods.

It is therefore an object of the invention to provide first a heat exchanger of the aforementioned kind in which a secure soldering connection is present without there being the risk that a part of the soldering agent can flow from the manifold to the lamella arrangement, or that damage to or destruction of the profiled pipe occurs. Moreover, the heat exchanger should be producible in a simple and cost-saving way.

This is achieved according to the invention in that between the manifold and the lamella arrangement at the outer side of the profiled pipe at least one obstruction, positioned transversely to the longitudinal direction of the pipe, is provided for preventing the flow of the soldering agent, for example, AlSi solder or AlZn solder, wherein by means of this obstruction the grooves extending in the longitudinal direction of the pipe profile are significantly reduced in their depth and/or are interrupted. By means of the obstruction, a soldering agent flow away from the actual soldering location is significantly reduced. The prescribed connection between the manifold, the profiled pipe, and the lamella arrangement is provided. By means of the obstruction, a safe means is provided in a simple way without great extra expenditure for reducing the soldering erosion.

In a special embodiment of the invention, the obstruction is formed as a smoothing zone of the profiled pipe. In this connection, the smoothing zone has a depth which is approximately 5–100 $\mu$m and preferably is not greater than 15% of the profiled pipe wall thickness. This smoothing zone prevents that the soldering agent flows by capillary action from the manifold to the lamella.

In a special embodiment of the invention, the obstruction is an embossment so that by means of a simple embossing action a portion transverse to the profile can already become practically groove-free. It is beneficial when the embossment is provided on both sides of the flat profiled pipe having a minimal curvature. A protection is obtained on both sides.

The invention also relates to a method for producing a heat exchanger, wherein extruded profiled pipe sections are attached on two manifolds, wherein between neighboring profiled pipe sections lamellar arrangements are connected by soldering.

However, it is also an object of the invention to design a method such that during soldering a safe connection can be obtained; at the same time, the method should be performable in a simple and cost-saving way; a groove-induced soldering erosion is to be prevented.

According to the invention this object is solved in that, before separating or cutting to length a strand, the profiled pipe sections are provided with at least one obstruction for interrupting the flow of the soldering agent. Such extruded flat profiled pipe sections then enable the safe construction of a heat exchangers.

It is beneficial when the obstruction is generated by an embossment which reduces the roughness of the profiled pipe because the method can be easily carried out in this way.

It is recommended in this connection to provide embossment tools on two oppositely positioned sides of the flat profiled pipe which produce the embossment simultaneously. This ensures that practically in a single working step the obstruction is produced around the profiled pipe; at the same time, by applying the embossment action on both sides, such a weak pressure is generated in the pipe that no or only minimal bending or deformation of the pipe is to be expected. According to a special embodiment of the invention, before cutting the sections, the embossment actions are performed on both sides of the cutting line on the profiled pipe. By the simultaneous embossment action on both sides of the cutting line, it is achieved that the one end of the profiled pipe section is provided with an obstruction while the adjacent profiled pipe section has at its leading end an embossment; again this method can be performed easily and cost-savingly.

In order to obtained a sufficient obstruction for the soldering agent as a function of the thickness of the pipe, the width and the depth of the embossment on the extruded profiled pipe can be adjustable as desired so that it is always ensured that a safe smoothing of the embossed pipe is realized.

By the configuration of the embossment tools and the embossment process, it is ensured that there is no disadvantageous effect on the properties for the prescribed use (seal-tightness, bursting pressure resistance, pressure change resistance, and corrosion resistance).

Figure 7:
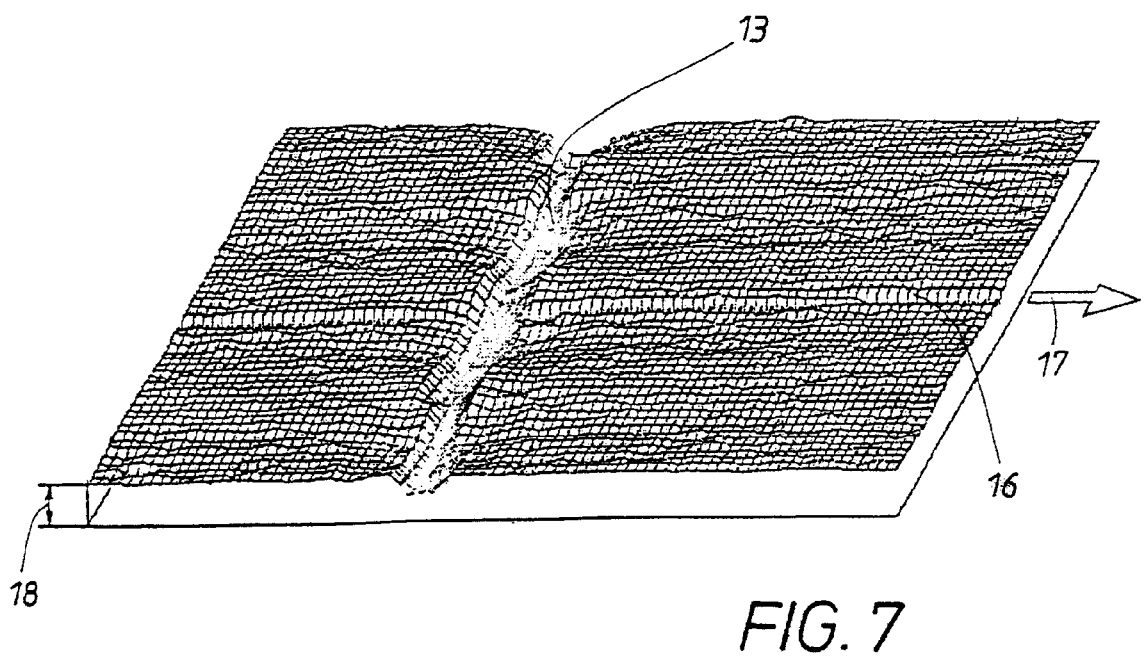

In the drawing the subject matter of the invention is illustrated in several embodiments; in particular, it is shown in:

FIG. 1 a partial section of a heat exchanger in a front view;

FIG. 2 a detail of the front view on an enlarged scale;

FIG. 3 a section of a profiled pipe section according to line III—III;

FIG. 4 a plan view onto a profiled pipe section according to the invention;

FIG. 5 a schematic illustration of an arrangement of the inventive embossments on a profiled pipe;

FIG. 6 a grid illustration of an aluminum surface embodied according to the invention;

FIG. 7 a grid arrangement of the surface of FIG. 6 but rotated by 90°.

First it should be mentioned that for the pipe which is to support the lamellas, the terms extruded profiled section, multi-chamber profiled pipe, and extruded profile will also be used.

The heat exchanger, a portion of which is illustrated schematically in FIG. 1, has substantially two manifolds 10, between which several profiled pipe sections 11 are provided; in this connection, a medium, in particular, cooling liquid, flows from one manifold 10 via the profiled pipe section 11. Between two neighboring profiled pipe sections a lamella arrangement 12 is provided which is comprised of individual lamellas and which is connected by soldering on the profiled pipe sections 11 in order to thus obtain a good heat transfer. The lamellas are positioned in an airflow in order to thus obtain a heat transfer via the lamellas and the profiled pipe section, be it for cooling or heating of the medium contained within the manifold.

The lamella arrangement is fastened on the profiled pipe sections and the ends of the sections are fastened on the manifolds by brazing. For this purpose, the lamella sheet metal and the manifolds can be provided with a solder coating. The profiled pipes can be provided with a corrosion-protecting layer, for example, zinc. It should also be mentioned that the manifolds are provided with slots into which the ends of the profiled pipe sections are inserted. Subsequently, brazing is carried out. The flow of the cooling medium through the profiled pipe sections is not impaired by this attachment and the embossment.

Between the manifold and the lamella arrangement, an embossment 13 is provided on the profiled pipe 11. The embossment extends on the bottom side and upper side of the flat profiled pipe sections.

The embossment does not result in a reduction of the inner cross-section of the extruded profile (FIG. 2).

This embossment has the effect that grooves generated during extrusion are significantly reduced in regard to their depth.

As a function of the manufacturing conditions, the extruded profiles have longitudinal grooves of up to 50 $\mu$m. For reducing the groove-induced soldering erosion it is possible, with significant expenditure, to reduce the depth of the grooves to decreased values, for example, smaller than 10 $\mu$m wherein the expenditure increases with decreasing groove depth. With the embossment according to the invention a range of roughness depth of less than 10 $\mu$m can be generated in a simple way.

The embossments effect that the brazing agent after melting cannot flow across the embossment so that a safe brazing action in the area of the manifolds as well as in the area of the lamella arrangement can be performed.

In the embodiment according to FIG. 3, two embossments are arranged adjacent to one another in order to obtain in this way a kind of multiple obstruction. This may be required when, because of variations of the insertion depth of the profiles into the manifolds, the prescribed positioning of the embossment between manifold and lamella is to be ensured.

It should also be mentioned in this context, that the embossment is carried out all around the profiled pipe; at least however on the two flat sides of the oval pipe which is formed as a multi-chamber pipe.

In the embodiment according to FIG. 5 portions of the extruded pipe are illustrated. It is reeled off a spool and, as already mentioned, can be coated with a zinc layer and/or a solder/flux agent layer. Embossment tools 14 are provided on both sides of the pipe so that with a single work step the upper side and bottom side of the pipe according to FIG. 5 can be provided with an embossment.

The cutting line 15 is illustrated between the two embossment tool pairs.

The end of one profiled pipe strand is thus first provided with two embossments; subsequently, the profiled pipe is cut between the two embossments 14.

Accordingly, with one embossing step, an embossment results on a first section of the profiled pipe at the end of the section and, at the same time, a further embossment is provided on the next profiled pipe section at the beginning of the section.

During the further process, the profiled pipe is then moved farther so that the end of the second section is embossed and the beginning of a third section, as illustrated schematically in FIG. 5.

In the embossment process the functional layers on the profile surface remain intact, i.e., the process is non-abrasive.

FIG. 6 and FIG. 7 show a surface of a profiled pipe, formed according to the invention, in the present case an embossed surface, viewed in two directions; the extrusion groove 16, which results from extrusion of the profiled pipe in the extrusion direction 17, is easily recognizable. Perpendicular to the groove the embossment 13 produces the solder agent obstruction according to the invention. The height 18 of the surface layer illustrated in FIG. 6 and 7 is approximately 72 $\mu$m in the illustrated embodiment.

As already mentioned, the illustrated embodiments are only exemplary realizations of the invention. The invention is not limited to them. Instead, other modifications are possible. The smoothing zone, which is produced by the embossments, could, for example, also be produced by grinding, whereby this would ensure that the roughness depth as in the area of the machining location would be significantly decreased in comparison to the remaining part of the profiled pipe. Moreover, it would be possible to provide instead of the embossment a deposit which then however must have a surface property which can compete with the roughness of the embossment. Moreover, in the case of the deposit it must be ensured that the deposit would not be destroyed by brazing. The embossment rolls could also be configured differently with regard to their width and their shape so that the embossment itself could be designed more flat and wider.

List of Reference Numerals 10 manifold
11 profiled pipe section
12 lamella arrangement
13 embossment
14 embossment tools
15 cutting line
16 extrusion groove
17 extrusion direction
18 height of the surface layer

What is claimed is:

1. Heat exchanger comprising:

extruded profiled pipes composed of aluminum or aluminum alloy, the profiled pipes are arranged parallel to one another and are connected with their two ends to a manifold, respectively, wherein between neighboring sides of two profiled pipes a lamella arrangement is connected by brazing, wherein at the outer side of the profiled pipe (11) between the manifold (10) and the lamella arrangement (12) at least one obstruction (13), extending transversely to a longitudinal direction, is provided for preventing the soldering agent flow, wherein in the obstruction (13) grooves extending in the longitudinal direction of the profiled pipe and produced by the extrusion of the profiled pipe in the extrusion direction are reduced in their depth and/or are interrupted, and that the obstruction (13) is formed as a smoothing zone of the profiled pipe, wherein the smoothing zone has a depth.

2. Heat exchanger according to claim 1, wherein the obstruction (13) has a depth which is approximately 5–100 μm and is not greater than 15% of the profiled pipe wall thickness.

3. Heat exchanger according to claim 1, wherein the obstruction (13) is formed as an embossment.

4. Heat exchanger according to claim 3, wherein the obstruction (13) is a deposit layer.

5. Heat exchanger according to claim 1, wherein the embossment is provided on the sides of the flat profiled pipe with a minimal curvature.

6. Method for manufacturing a heat exchanger comprising the steps of:

extruding a pipe to form a profile, arranging a plurality of profiled pipes (11) in parallel with one another and connecting ends into respective manifolds (10), connecting a lamella arrangement (12) between neighboring sides of two profiled pipes by brazing, providing at least one obstruction (13) on an outer side of the profiled pipe between the manifold and the lamella arrangement, extending transversely to the longitudinal direction of the profiled pipe by reducing and/or interrupting the depth of grooves produced by the extrusion of the profiled pipe in the extrusion direction, and forming the at least one obstruction (13) as a smoothing zone having a depth in the profiled pipe (11).

7. Method according to claim 6, wherein the obstruction (13) is applied to a pipe section (11) before cutting the profiled pipe.

8. Method according to claim 6, wherein the obstruction (13) is generated by an embossment reducing the roughness of the profiled pipe.

9. Method according to claim 8, wherein the width and depth of the embossment of the extruded profiled pipe (11) is adjusted as desired.

10. Method according to claim 8, wherein the embossment on the profiled pipe is carried out so as to maintain functional layers without material removal.

11. Method according to claim 6, wherein embossment tools (14) are arranged on two sides of a flat profiled pipe with minimal curvature and produce simultaneously an embossment on the profiled pipe (11).

12. Method according to claim 6, wherein, before cutting, the embossments (13) are produced on both sides of a cutting line (15).

13. Heat exchanger for use in automobile manufacture, comprising;

extruded profiled pipes composed of aluminum or aluminum alloy, the profiled pipes are arranged parallel to one another and are connected with their two ends to a manifold, respectively, wherein between neighboring sides of two profiled pipes a lamella arrangement is connected by brazing, wherein at the outer side of the profiled pipe (11) between the manifold (10) and the lamella arrangement (12) at least one obstruction (13), extending transversely to a longitudinal direction, is provided for preventing the soldering agent flow, wherein in the obstruction (13) grooves extending in the longitudinal direction of the profiled pipe and produced by the extrusion of the profiled pipe in the extrusion direction are reduced in their depth and/or are interrupted, and that the obstruction (13) is formed as a smoothing zone of the profiled pipe (11), wherein the smoothing zone has a depth.

* * * * *